United States Patent

[11] 3,582,837

[72] Inventor Adrian J. DeVries
Elmhurst, Ill.
[21] Appl. No. 681,524
[22] Filed Nov. 8, 1967
[45] Patented June 1, 1971
[73] Assignee Zenith Radio Corporation
Chicago, Ill.

[54] SIGNAL FILTER UTILIZING FREQUENCY-DEPENDENT VARIATION OF INPUT IMPEDANCE OF ONE-PORT TRANSDUCER
14 Claims, 3 Drawing Figs.

[52] U.S. Cl. .......... 333/72, 333/30
[51] Int. Cl. .......... H03h 9/32
[50] Field of Search .......... 333/30, 72, 6; 310/8, 9; 340/16

[56] References Cited

UNITED STATES PATENTS

| | | | |
|---|---|---|---|
| 3,401,360 | 9/1968 | Schultz-DuBois | 333/30 |
| 3,289,114 | 11/1966 | Rowen | 333/30 |
| 3,300,739 | 1/1967 | Mortley | 333/30 |
| 3,360,749 | 12/1967 | Sittig | 333/30 |
| 3,070,761 | 12/1962 | Rankin | 333/30 |
| 2,001,387 | 5/1935 | Hansell | 333/72 |

*Primary Examiner*—Herman Karl Saalbach
*Assistant Examiner*—C. Baraff
*Attorney*—Francis W. Crotty

ABSTRACT: A body of piezoelectric material propagates acoustic surface waves. A frequency-selective transducer is coupled to a surface of the body to interact with the surface waves. The transducer has a pair of terminals and in operation exhibits at those terminals an impedance that has a significant resistive component to signals of a predetermined frequency but which has a relatively insignificant resistive component to signals of frequencies within a desired operating range but differing from that predetermined frequency. Input signals are fed to the transducer while output signals are derived therefrom. The system constitutes a filter which need have but a single transducer element coupled to the acoustic waves.

INVENTOR.
Adrian J. DeVries
BY
Francis W. Crotty
Attorney

SIGNAL FILTER UTILIZING FREQUENCY-DEPENDENT VARIATION OF INPUT IMPEDANCE OF ONE-PORT TRANSDUCER

This invention pertains to signal translation systems. More particularly, it relates to solid-state tuned circuitry including an acousto-electric filter which involves interaction between a transducer coupled to a piezoelectric material and acoustic waves propagated in that material.

In copending application Ser. No. 582,387, filed Sept. 27, 1966, now abandoned I disclosed and claimed a number of different embodiments of acousto-electric devices in which acoustic surface waves propagating in a piezoelectric material interact with transducers coupled to the surface waves. In each of the embodiments particularly disclosed in that application, surface waves launched in the body of piezoelectric material are caused in one manner or another, to interact with a second transducer space along the surface from the first. In the simplest case, the first transducer is coupled to a source of signals while the second transducer is coupled to a load, the signal energy being translated by the acoustic waves between the two transducers. In actual practice, the acoustic-wave path length between the two transducers introduces a significant delay in translation of the signals. Such delay may be undesireable in certain applications. In addition, reflection of acoustic-wave energy may occur from the second or output transducer back to the first, and such reflection can undesirably alter the overall response of such devices.

It is, accordingly, a general object of the invention to provide a new and improved signal translation system of the aforesaid acousto-electric variety which overcomes the at least sometimes undesireable features of the prior acousto-electric systems.

It is another object of the present invention to provide a new and improved acousto-electric signal translation system in which the active portion of the system is but a two-terminal device.

It is a further object of the present invention to provide a new and improved acousto-electric signal translation system that is especially adaptable to fabrication utilizing integrated-circuit techniques.

A signal translation system constructed in accordance with the present invention includes a body of piezoelectric material that is propagative to acoustic surface waves. Coupled to a surface of the body is a frequency-selective transducer which interacts with the acoustic surface waves. The transducer has a pair of terminals which in operation exhibit an impedance that has a significant resistive component to signals of a predetermined frequency but has a relatively insignificant resistive component to signals of frequencies within a chosen range but differing from that predetermined frequency. Input signals are fed to the transducer by means coupled to its terminals, and signals are derived from the transducer by means also coupled to those terminals.

The features of the present invention which are believed to be novel are set forth with particularity in the appended claims. The organization and manner of operation of the invention, together with further objects and advantages thereof, may best be understood by reference to the following description taken in conjunction with the accompanying drawing, in the several figures of which like reference numerals identify like elements and in which:

Figures 1, 2:
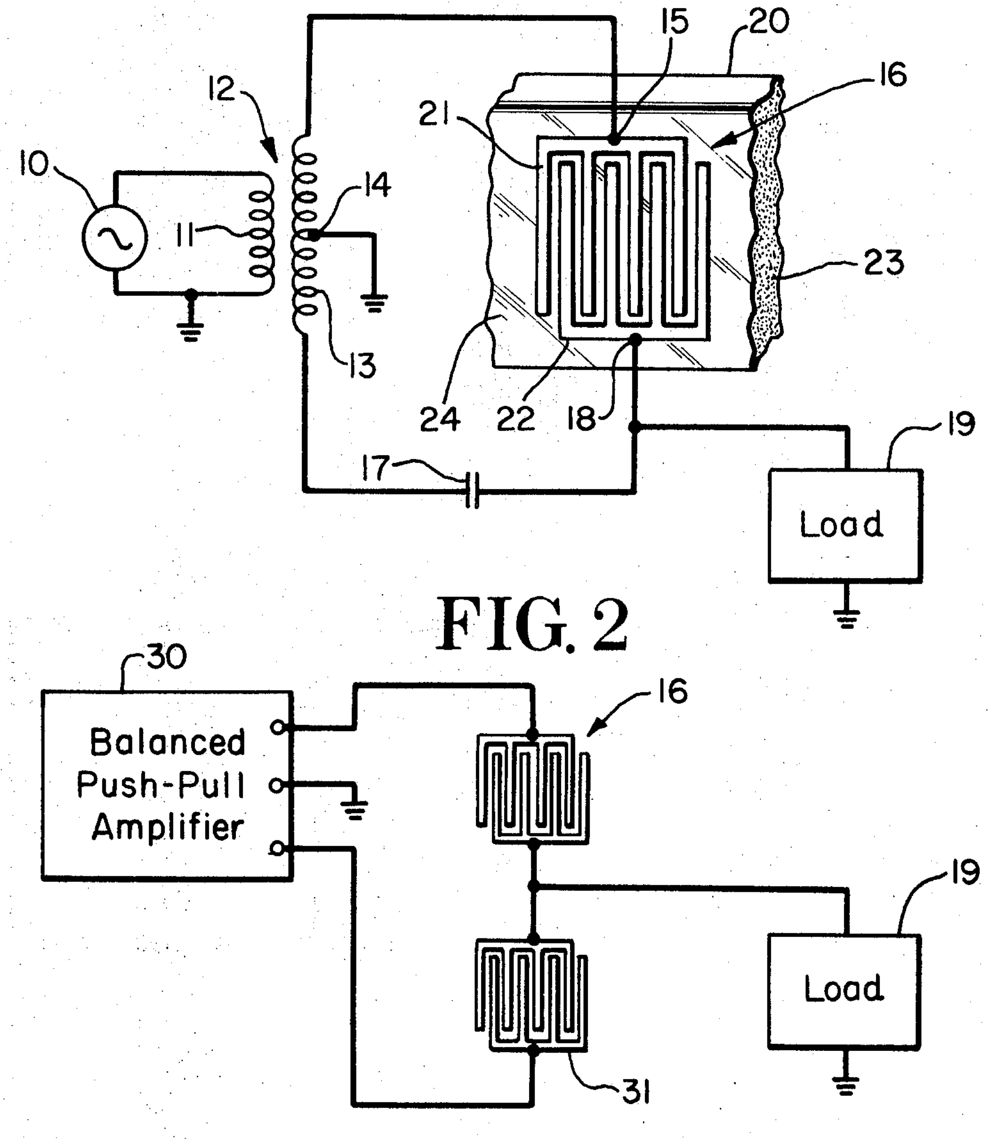
FIG. 1 is a schematic diagram, including a perspective view of an acoustic-electric filter element, of one embodiment of a signal translation system.
FIG. 2 is a schematic diagram, partially in block diagram form, of an alternative embodiment of a signal-translation system.

In FIG. 1, a source 10 of signals which may occur at a plurality of different frequencies is coupled across the input winding 11 of a transformer 12. One of the pair of leads coupling source 10 to winding 11 is connected to a plane of reference potential, here shown as ground, so that this input network is single ended or unbalanced. The secondary or output winding 13 of transformer 12 is tapped at its center point 14 and that point is returned to ground. One of the ends of winding 13 is connected to a terminal 15 of a transducer 16, while the other end of winding 13 is coupled through a capacitor 17 to the other terminal 18 of transducer 16. A load 19 is coupled between ground and a point intermediate capacitor 17 and terminal 18. With equal impedances presented by transducer 16 and capacitor 17, balanced or push-pull signals are desired across the ends of secondary winding 13. Of course, balanced operation also can be obtained with unequal impedances by correspondingly moving the position of tap 14.

Transducer 16 is coupled to one major surface of a piezoelectric body or substrate 20. The transducer is constructed of two comblike electrodes 21 and 22, the stripes of one comb electrode being interleaved with the stripes of the other comb electrode. The electrodes are formed of a material such as gold which may be vacuum deposited upon the plane surface of a polished piezoelectric body of a material such as PZT or quartz. The distance between the centers of two consecutive stripes is one-half of the acoustic wavelength, in the material of substrate 20, of a signal wave for which it is desired to achieve maximum response.

It is known that a transducer, composed of interleaved combs of conducting stripes or "teeth" to which are fed alternating electric potentials, when coupled to a piezoelectric medium produces acoustic surface waves on the medium which, in the simplified isotropic case of a ceramic poled perpendicularly to the surface, travel at right angles to the stripes. Conversely, the acoustic surface waves on the medium interact with the electrode array and are converted back to an electrical signal. Thus, in operation, direct piezoelectric surface-wave transduction is accomplished by the spatially periodic interdigital electrodes of transducer 16 and specifically by the periodic electric fields created between those electrodes in response to a signal from source 10 of a frequency such that the wavelength of the acoustic waves corresponds to the center-to-center spacing of two alternate teeth or stripes. This piezoelectric coupling to the surface waves occurs when the strain components produced by the electric fields in the piezoelectric substrate are substantially matched to the strain components associated with the surface-wave mode.

Source 10, for example a television receiver, produces a range of signal frequencies. But due to the selective nature of the arrangement, including transducer 16, only a signal of a particular frequency and its intelligence-carrying sidebands are converted to surface-wave energy. The result is that the single filter element, composed of transducer 16 and piezoelectric substrate 20, constitutes a selective-filter device. A significant resistive component of impedance, to be discussed more particularly hereafter, is exhibited across terminals 15 and 18 during operation when the signals from source 10 are of the frequency of maximum response which occurs when the acoustic wavelength approaches twice the center-to-center tooth separation. On the other hand, the impedance exhibited across terminals 15 and 18 has a relatively insignificant resistive component and becomes essentially a capacitive reactance for signals from source 10 of frequencies within a desired operating range but differing from that predetermined maximum response frequency.

It will be observed that source 10 is passively coupled to terminals 15 and 18 for feeding the input signal to transducer 16. Similarly, load 19 is passively coupled to those same terminals for deriving signals from transducer 16. In the particular arrangement of FIG. 1, the overall translation system is in the form of a bridge. That is, transducer 16 and its associated piezoelectric substrate 20 constitute a first arm of the bridge. The second bridge arm is capacitor 17, while the two sections of winding 13 on either side of tap 14 constitute the third and fourth arms of the bridge. Input source 10, for the illustrated equal-impedance case, is coupled by winding 11 equally to those third and fourth arms, while load 19 is coupled between the point intermediate the first and second arms and the point intermediate the third and fourth arms.

At the resonant frequency of transducer 16, when as mentioned a significant resistive component of impedance appears between terminals 15 and 18, the bridge is unbalanced and a useful fraction of the input signal is transferred to load 19. On the other hand, when the frequency of the signals from source 10 departs from that resonant frequency by a sufficient amount in relation to the equivalent Q of the transducer, the impedance presented across terminals 15 and 18 is primarily capacitive. By assigning a value to capacitor 17 substantially equal to that capacitance presented between terminals 15 and 18, the transfer of energy to load 19 is substantially reduced in the off-resonance condition. Considerations determining the Q of the transducer are recited in my aforesaid copending application.

In a typical embodiment, utilizing quartz as the piezoelectric material of substrate 16, the stripes of transducer 16 are approximately 0.7 mil wide and are separated by 0.7 mil for a 40 megahertz application. The width of the comb structure, from top to bottom of FIG. 1, is approximately 0.4 inch. This structure acts as a single-tuned circuit with a resonant frequency of 40 megahertz, the resonant frequency being determined by the spacing of the stripes, as pointed out hereinbefore.

The potential developed between any given pair of stripes produces two waves traveling along the surface of substrate 20 in opposing directions perpendicular to the stripes for the isotropic case (as when using PZT) and in any event generally laterally away from the stripes. When the distance between the stripes is one-half of the acoustic wavelength at the desired input frequency, or an integral multiple thereof, a maximum of acoustic-wave development occurs. For increased selectivity, additional electrode stripes are added to produce a longer comb pattern of the type depicted.

Because waves propagate outwardly away from transducer 16, the assembly includes means located in the path of those waves in order to attenuate them. To this end, the opposing end surfaces 23 and 24 of body 20 are shaped to have an irregular contour. Consequently, the waves upon reflection from the end surfaces are scattered and thereby attenuated in multiple reflections. Hence, the interaction between transducer 16 and the acoustic surface waves in body 20 is primarily effective only with those wave as they originally are developed. Interaction with waves which otherwise might be reflected from planar end surfaces, and which would include phase-delayed signal information, is minimized and is essentially prevented.

In the system of FIG. 2, transformer 12 of FIG. 1 is replaced by a push-pull amplifier 30 the output of which is balanced with respect to ground. This alternative input arrangement likewise may be employed in the system of FIG. 1, or the input arrangement of FIG. 1 may be used in FIG. 2. Also in the system of FIG. 2, capacitor 17 is replaced by a second selective device 31 constructed in the same manner as the combination of transducer 16 and piezoelectric substrate 20. That is device 31 likewise is composed of an electrode array affixed to a surface of piezoelectric material propagative of acoustic surface waves, and the array is composed of interleaved combs of conductive elements with the center-to-center spacing between those elements being effectively one-half the length of the acoustic surface waves at a selected frequency. In this case, that selected frequency to which the second array is resonant is somewhat different from the predetermined frequency to which transducer 16 is selective in order to attain a condition of unbalance in the bridge at a desired operating frequency range to effect a transfer of signal energy to load 19. At a frequency separated from the frequency of maximum system response, the impedances of transducers 16 and 31 are at least nearly the same and the bridge is substantially balanced, resulting in but a low output level to load 19. On the other hand, in the region of maximum response of both transducers, the bridge is highly unbalanced and a substantial output signal is developed across load 19.

Figure 3:
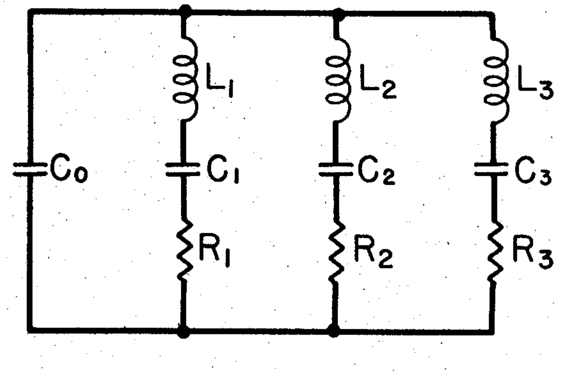
FIG. 3 is a schematic diagram of a circuit equivalent to a portion of the systems of FIGS. 1 and 2.

As a matter of coarse approximation, transducers 16 and 31 may each be represented electrically by the parallel combination of a capacitance $C_0$ with a with a series circuit containing a resistor, an inductor and a capacitor. Referring to FIG. 3 and limiting the consideration to the generation of surface waves, the equivalent circuit is shown as capacitor $C_0$ in parallel with the series arrangement of inductor $L_1$, capacitor $C_1$, and resistor $R_1$. Of these, capacitor $C_0$ is a parameter referred to as the clamped capacitance of the transducer because it is the capacitance measured with inhibition of all mechanical motion. At the region of maximum efficiency of surface-wave transduction, or maximum response of the transducer, the branch network $L_1$, $C_1$, $R_1$ is resonant and represents essentially a resistive impedance. This is the significant resistive component of impedance referred to above and in the appended claims. Its significance decreases at frequencies differing from the resonant or maximum response frequency in a manner analogous to the impedance change of a tuned circuit which, as is well understood, is a function of the Q of the device. Outside the region of maximum efficiency of surface-wave transduction, the transducer impedance is primarily represented by the capacitance $C_0$. In the system of FIG. 1 as shown, then, it is primarily the clamped capacitance $C_0$ which is balanced against capacitor 17; this approximation assumes that capacitance $C_0$ is substantially greater than the value of the capacitance represented by the capacitor in the paralleled equivalent series circuit so that, below resonance, the net capacitive impedance is essentially determined by capacitance $C_0$. Any difference between the values of capacitor 17 and the clamped capacitance of transducer 16 may be compensated by changing the position of tap 14. In the FIG. 2 system, either both transducers should be selected to have like values of $C_0$ or any difference should be compensated by purposefully unbalancing amplifier 30. Further with reference to FIg. 2, possible capacitance variations between the two transducers due to fabrication tolerances may be avoided by disposing both transducers 16 and 31 on the same substrate at the same time.

The choice of frequencies of maximum response for transducers 16 and 31 is dictated by the response characteristic desired of the signal translating device. The individual response of each such transducer is similar to that of a crystal filter but, as pointed out above, each transducer has a readily adjustable equivalent Q as determined by the selected frequency of maximum response of each transducer and their equivalent Qs.

With respect to both FIGS. 1 and 2, it should be noted that the particular surface wave transducers employed also generate bulk waves in the shear and longitudinal modes. Such bulk waves are developed at frequencies above the surface-wave frequencies. For example, with the transducer designed to produce surface waves at 10 megahertz, bulk shear waves are developed in the region of 20 megahertz while bulk longitudinal waves are produced at a frequency in the neighborhood of 30 megahertz. Such bulk waves travel into the body of the substrate material at an angle to the surface.

In the frequency ranges at which such bulk waves are generated, the transducer impedance also exhibit a significant resistive component. In effect, then, transducer 16 in FIGS. 1 and 2 is more completely described by the equivalent circuit shown in FIG. 3. As discussed above, this circuit includes the clamped capacitance $C_0$ paralleled by the series combination of an inductor $L_1$, a capacitor $C_1$ and a resistor $R_1$, the series combination exhibiting resonance at the point of maximum surface-wave transduction. At the same time, the circuit further includes, also in parallel with $C_0$, another series combination $L_2$, $C_2$ and $R_2$ together with a still further series combination $L_3$, $C_3$ and $R_3$. The first of these added pair of series combinations exhibits resonance at the point of maximum development of the bulk shear waves and the second exhibits its resonance at the point of maximum generation of bulk longitudinal waves. The arrangements of FIGS. 1 and 2 contemplate operation in the frequency range associated with surface wave generation.

Because of the existence of these additional resonant circuits, it will be observed that the bridge network of FIG. 1 actually will be unbalanced at undesired operating frequency ranges unless capacitor 17 is replaced by a more complicated network. While such compensating may be unnecessary in many applications, when desired capacitor 17 may be replaced by an electrical network like that of FIG. 3, except for the omission of $L_1$, $C_1$, and $R_1$, to obtain essentially complete compensation. On the other hand, partial compensation may be all that is desired in some cases so that only one of the network branches of elements $L_2$–$C_2R_2$ or $L_3$–$C_3R_3$ of FIG. 3 is included. In any case, the elements of the compensatory network are chosen so that the equivalent circuit components of FIG. 3 are simulated as closely as desired outside the range of surface-wave frequencies. It may be noted further that the arrangement of FIG. 2 automatically achieves a high degree of compensation because transducer 31 is preferably identically formed as, but exhibits a slightly different frequency of maximum response than, transducer 16.

It will be observed that the overall circuitry of the systems of FIGS. 1 and 2 resembles approaches utilized with simple piezoelectric crystal filters in which advantage is taken of the series resonance, exhibited by an ordinary piezoelectric crystalline element at a given frequency, to afford a selective response. However, those filters exhibit a very narrow passband. In contrast, utilization of the surface-wave interaction principle employed by the circuitry of FIGS. 1 and 2 enables the attainment of an overall bandwidth through the entire signal-translation network comparable to the bandwidth of the surface-wave transducer itself. That is, in FIG. 1 the overall bandwidth of the network is primarily a function of the bandwidth of transducer 16 rather than of some characteristic of piezoelectric body 20. As pointed out above, the bandwidth of transducer 16 is selectively adjustable by means of the choice of the number of stripe elements in the electrode combs. Moreover, the bandwidth attainable may be adjusted either initially by the choice of the number of stripes to be provided or subsequently through a selective switching network to increase or decrease the number of stripes used at a given time.

Having incorporated transducer 16 and its associated piezoelectric substrate 20 into a particularly advantageous overall network arrangement, it will be apparent upon consideration of the attributes of the filter device itself that it also may be utilized in other networks. Such networks are known as such but heretofore have made use of ordinary piezoelectric crystalline elements in which selectivity or bandwidth is a function of the characteristics of the crystalline material and its dimensions. In any event, it is to be noted that the assembly is employed as a two-terminal device, as a result of which signal delay is minimized. At the same time, difficulty is avoided with response to interaction with reflected signal energy. Moreover, the entire selective-filter system is subject to fabrication as a single integrated circuit.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. A signal translation system comprising:

a body of piezoelectric material propagative of acoustic waves;

a frequency-selective transducer coupled to a surface of said body to interact with acoustic waves having frequencies within a particular range, said transducer having but a pair of terminals which in operation exhibit an impedance that has a significant resistive component to signals of a predetermined frequency within said range but has a relatively insignificant resistive component to signals within said range and differing from said predetermined frequency;

input transducer; coupled to said terminals for feeding signals to said transducer;

and output means coupled to said terminals for deriving signals from said transducer.

2. A system as defined in claim 1 in which said transducer is an electrode array composed of interleaved combs of conductive elements with the center-to-center spacing between said elements being effectively one-half the length of the acoustic surface waves at said predetermined frequency, said terminals being coupled individually to respective ones of said combs.

3. A system as defined in claim 1 in which said input means includes an amplifier producing two signals of opposite phase and of respective amplitudes effecting balance between said signals at said predetermined frequency.

4. A system as defined in claim 1 in which said input means includes a balance push-pull amplifier.

5. A system as defined in claim 1 in which said input means includes means for converting unbalanced input signals to signals of balanced character.

6. A system as defined in claim 1 in which said system is arranged to include a four-armed bridge with said transducer constituting a first arm of said bridge, a capacitive reactance element constituting a second arm of said bridge coupled at one end of said first arm, and a pair of impedance elements individually constituting respective third and fourth arms of said bridge and coupled in series between the other ends of said first and second arms, said input means being coupled to said third and fourth arms of said bridge and said output means being coupled between said one end of said first and second arms and the junction of said third and fourth arms.

7. A system as defined in claim 6 in which said second arm exhibits an impedance simulating the impedance exhibited by said transducer at frequencies other than said predetermined frequency.

8. A system as defined in claim 7 in which said capacitive-reactive element comprises:

a frequency-selective second transducer coupled to a body of piezoelectric material propagative of acoustic surface waves to interact with the acoustic surface waves therein, said second transducer having but a pair of terminals across which in operation is exhibited an impedance having a significant resistive component to signals of a selected frequency different from said predetermined frequency and which becomes essentially capacitive to signals of frequencies departing from said selected frequency.

9. A system as defined in claim 8 in which the clamped capacitances of said first and second transducers are the same.

10. A system as defined in claim 6 in which said impedance elements of said third and fourth arms are inductive.

11. A system as defined in claim 6 in which, for signals departing in frequency from said predetermined frequency by a specific amount, the impedance of said capacitive reactance element in said second arm is substantially equal to the impedance exhibited across said terminals.

12. A system as defined in claim 1 in which said transducer interacts with acoustic waves propagating generally in a given direction along a surface of said body and in which said body includes means located, in the path of and attenuative of said acoustic waves.

13. A system as defined in claim 1 in which said transducer interacts with acoustic waves propagating generally in a given direction along a surface of said body and in which an end surface of said body oriented generally transverse to said direction is of irregular contour.

14. A signal translation system comprises:

a body of piezoelectric material propagative of acoustic waves;

a first frequency-selective transducer coupled to a first surface portion of said body to interact with a first set of acoustic surface waves on said body;

a second frequency-selective transducer coupled to a second surface portion of said body to interact with a second set of acoustic surface waves on said body;

means for applying signals, in push-pull relation relative to a plane of reference potential, across said first and second transducers in series combination;

and means for deriving signals from a point in said series combination intermediate said first and second transducers and said plane of reference potential.